Patented May 14, 1935

2,000,927

UNITED STATES PATENT OFFICE 2,000,927

PLASTIC COMPOSITION AND METHOD OF WORKING THE SAME

Kenneth H. Crutchfield, Cumberland, Md., assignor to Celanese Corporation of America, a corporation of Delaware No Drawing. Application January 16, 1930, Serial No. 421,310

15 Claims. (Cl. 18—57)

This invention relates to plastic compositions containing derivatives of cellulose and relates more particularly to the preparation of plastic compositions in sheet or other form that are suitable for use in the manufacture of laminated glass.

An object of my invention is to render plastic compositions more plastic whereby they may be molded under less pressure than is required in the working of similar plastic compositions.

A further object of my invention is to prepare sheets containing organic derivatives of cellulose such as cellulose acetate which have therein or thereon such amounts of suitable organic liquids that increase the plasticity thereof, that the same are readily flowable under pressure and therefore highly suited for the preparation of laminated glass. Other objects of my invention will appear from the following detailed description.

I have found that if a hydroxy-carboxylic acid is added to a plastic composition containing a derivative of cellulose, the plasticity of the same is materially increased so that the same may be worked into desired form with the application of lower pressure than has been heretofore required.

In accordance with my invention, I treat a composition containing a derivative of cellulose with a hydroxy-carboxylic acid that increases the plasticity thereof. The composition is thus caused to become more plastic and may be more readily worked under pressure.

The derivative of cellulose employed in the plastic composition may be any suitable derivative such as cellulose nitrate and particularly organic derivatives of cellulose such as organic esters of cellulose and cellulose ethers. Examples of organic esters of cellulose are cellulose acetate, cellulose formate, cellulose propionate and cellulose butyrate; while examples of cellulose ethers are ethyl cellulose, methyl cellulose and benzyl cellulose.

The composition to be treated in accordance with my invention preferaby contains suitable plastifiers or softening agents.

While I have found that the best results are obtained when the composition contains tartrate esters such as dibutyl tartrate, dibenzyl tartrate or diethyl tartrate, other plastifiers such as triacetin, diethyl phthalate, or dibutyl phthalate with or without the tartrate esters may be used. The composition may also contain residual solvents used in the manufacture of the same. The composition may be in the form of powder, sheets, blocks or irregularly shaped articles.

The hydroxy-carboxylic acid that is employed for imparting plasticity to the plastic composition may be any suitable one such as tartaric acid or citric acid. It may be employed in conjunction with any plastifier as above described, and a solvent or swelling agent for the derivative of cellulose such as butyl actetate, ethyl alcohol and the like. Often it is desirable to add a synthetic resin compatible with the derivative of cellulose, examples of such synthetic resins being diphenylol propane-formaldehyde resin, the fusible and soluble resin prepared by condensing phenol and aldehyde in the presence of an acid catalyst, toluene sulfonamid-formaldehyde resin, etc.

One application of my invention is in the preparation of molding powders containing organic derivatives of cellulose such as cellulose acetate. These molding powders comprise a mixture of finely divided cellulose acetate and a plastifier, and may contain filling material, pigments, dyes or other material for effect. The molding powder is converted into solid objects by compressing the same under heat and pressure. By the addition of the material containing the hydroxy-carboxylic acid that increase plasticity to such molding powders, in accordance with my invention, the amount of pressure required to form celluloid-like articles from such molding powder is materially reduced.

An important application of my invention is in the preparation of laminated glass, which has wide use in automobiles and other moving vehicles because of its shatterless properties. This laminated glass consists of one or more layers of celluloid-like sheets interposed between two or more sheets of glass, the glass and celluloid sheets being held together by an adhesive in the preparation of such laminated glass. The glass and the celluloid-like sheets are pressed together after the surfaces of either or both have been coated with an adhesive. In many processes, this pressing of the glass and the celluloid-like sheet is done in some type of hydraulic press at elevated temperature and under pressure of several hundred pounds. The temperature and pressure employed is generally such as to render the celluloid-like sheets and the adhesive so plastic that they begin to flow, since in order to obtain best results it is necessary that the plastic or celluloid-like sheets should conform itself to any unevenness of the glass, in order to obtain equal adhesion of the plastic to the glass at all points. If substantially lower pressure and temperatures are used than are required to obtain the desired plasticity, the adhesion of the glass to the celluloid-like sheet will be poor and the laminated glass will not have the desired non-shatterable properties.

From an economical and technical point of view, the use of high pressures and temperatures is undesirable because of the great difficulty and cost of obtaining them. Moreover, the higher the pressure, the greater is the danger of breakage of the glass. By the use of my invention the pressure required for making laminated glass is greatly reduced.

In carying out my invention, the plastic sheets alone or the plastic and the adhesive coated glass may be soaked in a bath containing the hydroxycarboxylic acid for periods varying from one to two seconds to 15 minutes or more, preferably for but several seconds.

The bath in which the sheets are soaked may, if desired, contain besides the plasticity-imparting organic liquids other materials, examples of which are softeners or swelling agents such as triacetin, diphenylol propane, butyl acetate and/or ethyl alcohol.

Instead of incorporating the hydroxy-carboxylic acid by soaking the formed sheets in a bath containing the same, the hydroxy-carboxylic acid may be added to the plastic at any stage of the manufacture of the same. Thus in the preparation of a plastic from cellulose acetate and softening agent, the suitable hydroxycarboxylic acid may be added to the softening agent or to any of the volatile solvents employed.

Laminated glass when prepared in accordance with my invention is free of letgoes, nor do letgoes develop after the same has been permitted to age for an appreciable period of time. When the laminated glass is subjected to impact, substantially all the glass adheres to the plastic sheet or film and does not shatter away.

In order further to illustrate my invention but without being limited thereto, the following specific example is given.

Example

A sheet of plastic material containing 2 parts of cellulose acetate and 1 part of dibutyl tartrate is dipped in a bath which is made by mixing the following ingredients:

| | |
|---|---|
| Tartaric acid | 15 kilos |
| Triacetin | 140 liters |
| Butyl acetate | 260 do. |
| Ethyl alcohol | 50 do. |

The purpose of the ethyl alcohol is to aid in the formation of a homogeneous solution of the ingredients. This solution is filtered if necessary.

The sheet of plastic material is then inserted between adhesive coated sides of sheets of glass, which may or may not have been previously dipped in the bath. As an example of a suitable adhesive for the sheets, it may be stated that the film formed from a solution in a volatile solvent of cellulose acetate, diphenylol propane-formaldehyde resin compatible therewith and triacetin is quite suitable.

The assembly of the plastic sheets and the adhesive coated glass is then inserted between the platens of a press and are pressed for 5 minutes at 200 lbs. per square inch pressure, the platens being heated internally by steam at 10 lbs. per square inch pressure. A laminated glass that is quite clear is produced, and this glass is free of letgoes. When subjected to impact, the glass does not shatter away from the laminated glass.

It is to be understood that the foregoing detailed description is given merely by way of illustration and that many variations may be made therein without departing from the spirit of this invention.

Having described my invention what I claim and desire to secure by Letters Patent is:

1. Method of rendering compositions containing derivatives of cellulose more plastic comprising incorporating and retaining in said compositions a suitable hydroxy-carboxylic acid adapted to increase the plasticity thereof.

2. Method of rendering compositions containing organic derivatives of cellulose more plastic comprising incorporating and retaining in said compositions a suitable hydroxy-carboxylic acid adapted to increase the plasticity thereof.

3. Method of rendering compositions containing cellulose acetate more plastic comprising incorporating and retaining in said compositions a suitable hydroxy-carboxylic acid adapted to increase the plasticity thereof.

4. Method of rendering sheets containing organic derivatives of cellulose more plastic comprising soaking said sheets in a bath containing a suitable hydroxy-carboxylic acid.

5. Method of rendering sheets containing cellulose acetate more plastic comprising soaking said sheets in a bath containing tartaric acid.

6. Method of rendering sheets containing organic derivatives of cellulose more plastic comprising soaking said sheets in a non-aqueous bath containing a suitable hydroxy-carboxylic acid.

7. Method of rendering sheets containing cellulose acetate more plastic comprising soaking said sheets in a non-aqueous bath containing tartaric acid.

8. Method of rendering sheets containing cellulose acetate more plastic comprising treating said sheets with a liquid containing a plastifier and tartaric acid.

9. Method of rendering sheets containing cellulose acetate more plastic comprising treating said sheets with a non-aqueous liquid containing a plastifier and tartaric acid.

10. Method of rendering plastic sheets containing cellulose acetate and a tartrate ester more plastic comprising treating said sheets with a non-aqueous liquid containing triacetin, tartaric acid, butyl acetate and alcohol.

11. Method of rendering plastic sheets containing cellulose acetate and a tartrate ester more plastic comprising treating said sheets with a liquid containing triacetin, tartaric acid, butyl acetate and alcohol.

12. A plastic composition substantially free from water and containing an organic derivative of cellulose and a hydroxy-carboxylic acid adapted to increase the plasticity thereof.

13. A plastic composition substantially free from water and containing cellulose acetate and an amount of tartaric acid.

14. Celluloid-like sheets containing organic derivatives of cellulose and a hydroxy-carboxylic acid.

15. Celluloid-like sheets containing cellulose acetate and tartaric acid.

KENNETH H. CRUTCHFIELD.